US008295300B1

(12) United States Patent
Chartier

(10) Patent No.: US 8,295,300 B1
(45) Date of Patent: Oct. 23, 2012

(54) PREVENTING FORWARDING OF MULTICAST PACKETS

(75) Inventor: Michael John Chartier, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 227 days.

(21) Appl. No.: 11/933,370

(22) Filed: Oct. 31, 2007

(51) Int. Cl.
H04J 3/26 (2006.01)

(52) U.S. Cl. ....................................................... 370/432

(58) Field of Classification Search ........................ None
See application file for complete search history.

(56) References Cited

U.S. PATENT DOCUMENTS

| 6,167,051 | A  | * | 12/2000 | Nagami et al. | 370/397 |
| 6,272,113 | B1 | * | 8/2001  | McIntyre et al. | 370/248 |
| 6,331,983 | B1 | * | 12/2001 | Haggerty et al. | 370/400 |
| 6,370,142 | B1 | * | 4/2002  | Pitcher et al. | 370/390 |
| 6,408,000 | B1 | * | 6/2002  | Lamberg et al. | 370/390 |
| 6,735,201 | B1 | * | 5/2004  | Mahajan et al. | 370/390 |
| 7,184,421 | B1 | * | 2/2007  | Liu et al. | 370/338 |
| 7,283,525 | B2 | * | 10/2007 | Burgess et al. | 370/392 |
| 7,305,010 | B2 | * | 12/2007 | Hayashi et al. | 370/473 |
| 7,394,779 | B2 | * | 7/2008  | Seo et al. | 370/316 |
| 7,573,881 | B2 | * | 8/2009  | Cain et al. | 370/392 |
| 7,653,057 | B1 | * | 1/2010  | Fromm et al. | 370/389 |
| 7,710,962 | B2 | * | 5/2010  | Kodama et al. | 370/390 |
| 8,185,615 | B1 | * | 5/2012  | McDysan et al. | 709/223 |
| 2003/0147392 | A1 | * | 8/2003 | Hayashi et al. | 370/390 |
| 2004/0071137 | A1 | * | 4/2004 | He et al. | 370/390 |
| 2005/0041665 | A1 | * | 2/2005 | Weyman et al. | 370/390 |
| 2005/0080901 | A1 | * | 4/2005 | Reader | 709/226 |
| 2005/0091313 | A1 | * | 4/2005 | Zhou et al. | 709/204 |
| 2005/0111474 | A1 | * | 5/2005 | Kobayashi | 370/432 |
| 2005/0117576 | A1 | * | 6/2005 | McDysan et al. | 370/389 |
| 2005/0152331 | A1 | * | 7/2005 | Shaw et al. | 370/351 |
| 2005/0157741 | A1 | * | 7/2005 | Wu et al. | 370/432 |
| 2005/0195816 | A1 | * | 9/2005 | Sumiyoshi | 370/390 |
| 2005/0281265 | A1 | * | 12/2005 | Sakamoto et al. | 370/390 |
| 2006/0002370 | A1 | * | 1/2006 | Rabie et al. | 370/351 |
| 2006/0034281 | A1 | * | 2/2006 | Cain et al. | 370/390 |
| 2006/0036733 | A1 | * | 2/2006 | Fujimoto et al. | 709/225 |
| 2007/0047545 | A1 | * | 3/2007 | Bou-Diab et al. | 370/390 |
| 2007/0226804 | A1 | * | 9/2007 | Somkiran et al. | 726/24 |
| 2007/0253409 | A1 | * | 11/2007 | Fu et al. | 370/389 |
| 2007/0274307 | A1 | * | 11/2007 | Karino et al. | 370/389 |
| 2007/0297454 | A1 | * | 12/2007 | Brothers | 370/486 |
| 2008/0002674 | A1 | * | 1/2008 | Lubbers et al. | 370/352 |
| 2008/0002690 | A1 | * | 1/2008 | Ver Steeg et al. | 370/390 |
| 2008/0062948 | A1 | * | 3/2008 | Ponnuswamy | 370/342 |
| 2008/0165771 | A1 | * | 7/2008 | Gainey et al. | 370/390 |
| 2008/0219237 | A1 | * | 9/2008 | Thubert et al. | 370/349 |
| 2010/0195651 | A1 | * | 8/2010 | Dayong et al. | 370/390 |

* cited by examiner

Primary Examiner — Ayaz Sheikh
Assistant Examiner — Faiyazkhan Ghafoerkhan
(74) Attorney, Agent, or Firm — Clements Bernard PLLC; Christopher L. Bernard; Lawrence A. Baratta, Jr.

(57) ABSTRACT

Packet switch operating methods and packet switches determine an identifier of an authorized multicast packet service, the multicast packet service being provided from a first device connected to the packet switch, receive a multicast packet comprising the identifier from a different second device connected to the packet switch, determine the multicast packet is unauthorized, and prevent the packet switch from forwarding the unauthorized multicast packet to a third device connected to the packet switch. Other packet switches include a first port, a second port, a third port, and forwarding circuitry connected to the first, second, and third ports. The forwarding circuitry is configured to forward first packets comprising a particular multicast destination address received from the first port to the second and third ports and to prevent second packets comprising the particular multicast destination address received from the second port from being forwarded to the third port.

20 Claims, 4 Drawing Sheets

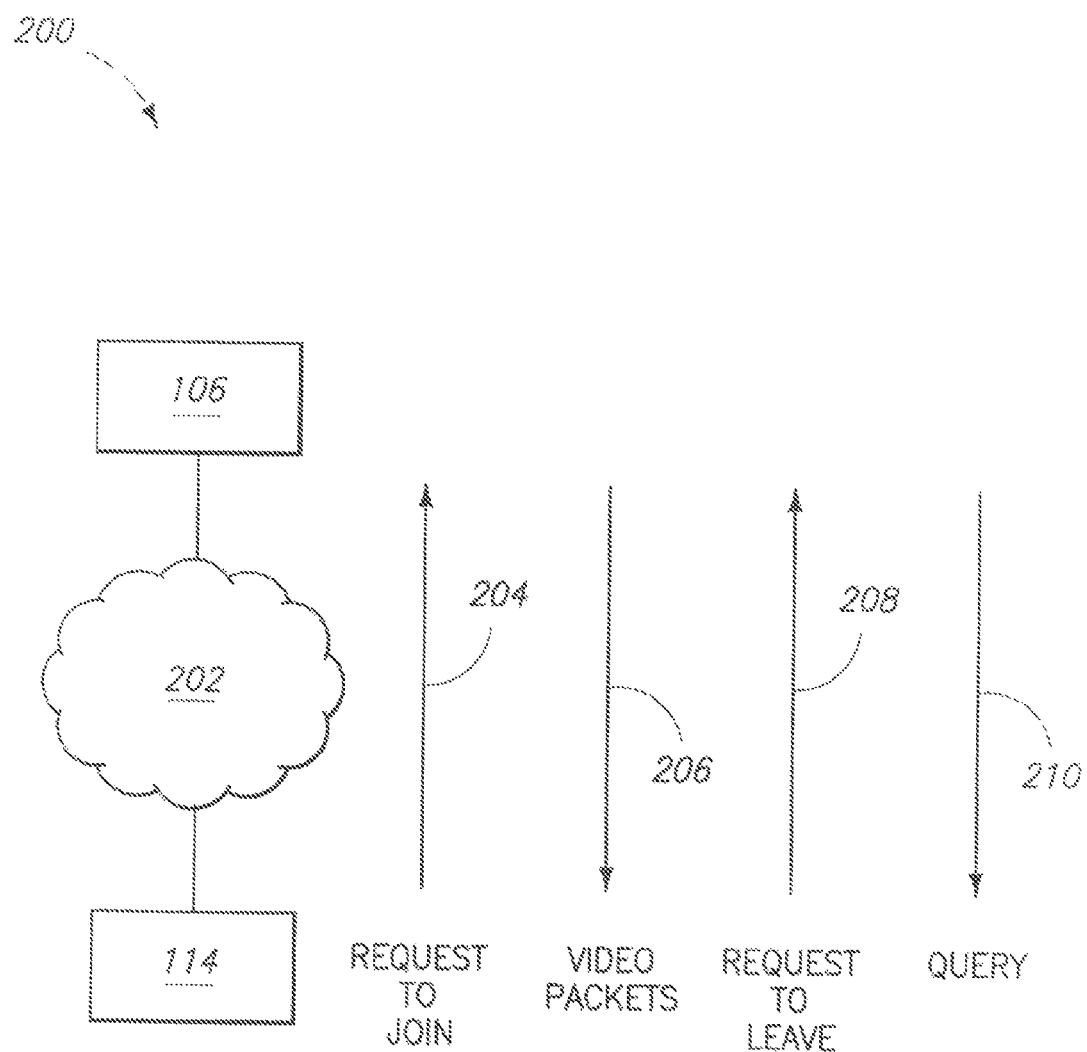

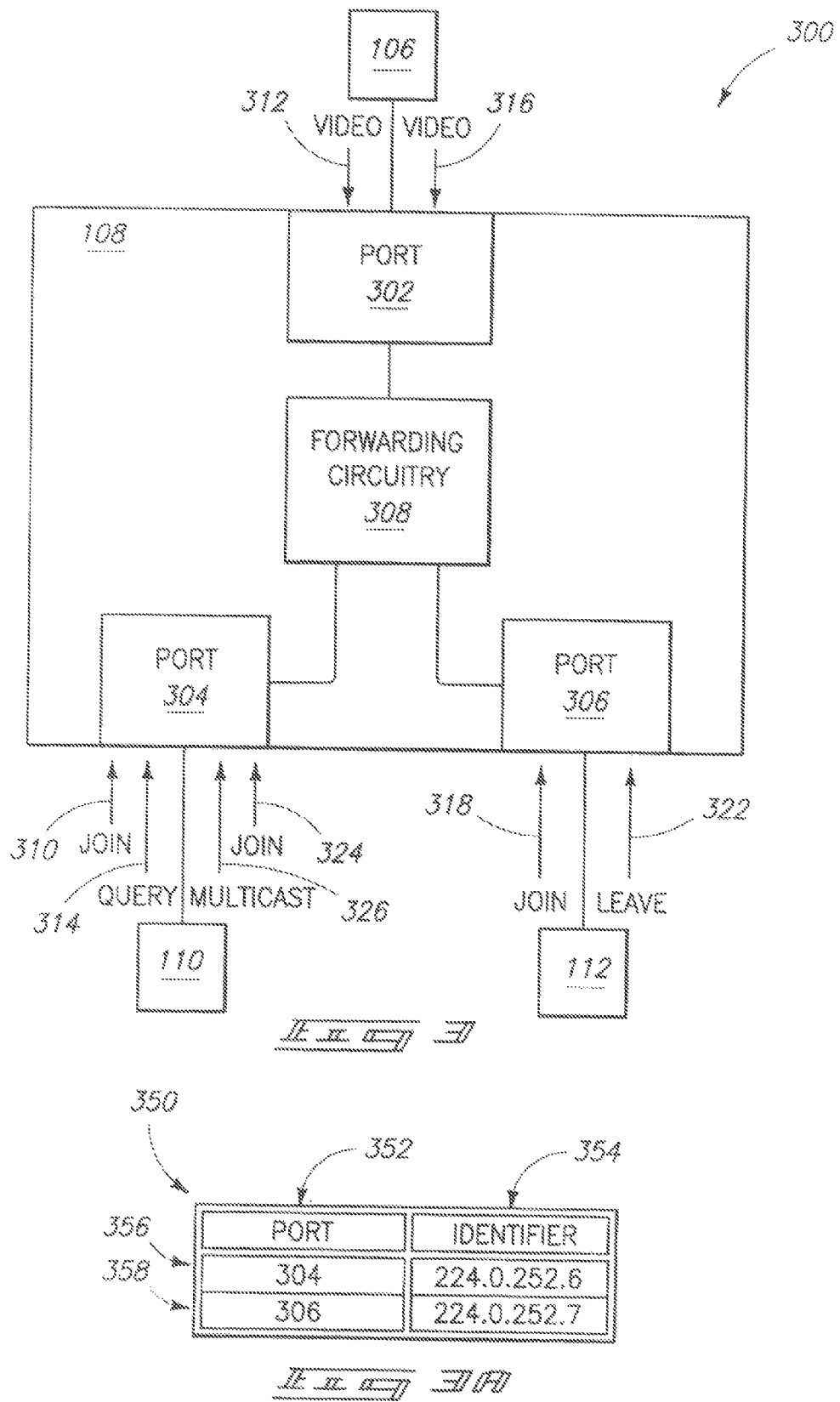

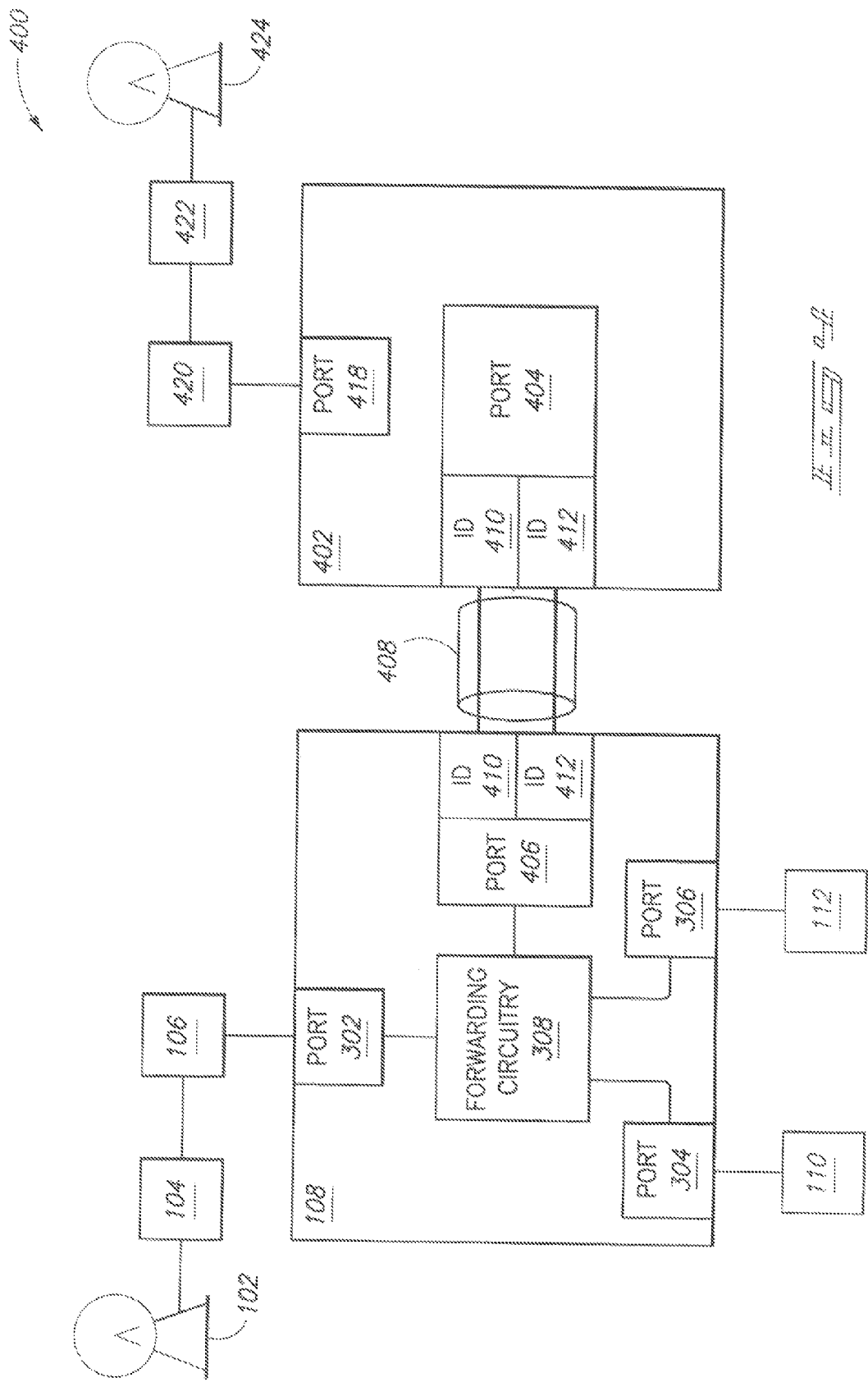

PREVENTING FORWARDING OF MULTICAST PACKETS

TECHNICAL FIELD

The present invention, in various embodiments, relates to preventing forwarding of multicast packets.

BACKGROUND OF THE INVENTION

Multicast distribution is an efficient, powerful way of distributing packets of interest to a plurality of end devices throughout a network to the end devices. Consequently, multicast distribution may be used to provide packets bearing a video signal, such as a television channel, to a plurality of end devices of a network. However, multicast distribution may just as easily intentionally or unintentionally distribute packets that are not of interest to the end devices.

BRIEF DESCRIPTION OF THE DRAWINGS

Preferred embodiments of the invention are described below with reference to the following accompanying drawings.

FIG. 2 is a chart illustrating messaging associated with a multicast packet service.

FIG. 3 is another block diagram of a network.

FIG. 3A is a chart illustrating identifiers of multicast packet services.

FIG. 4 is a block diagram of another network.

DETAILED DESCRIPTION OF THE PREFERRED EMBODIMENTS

Figure 1:
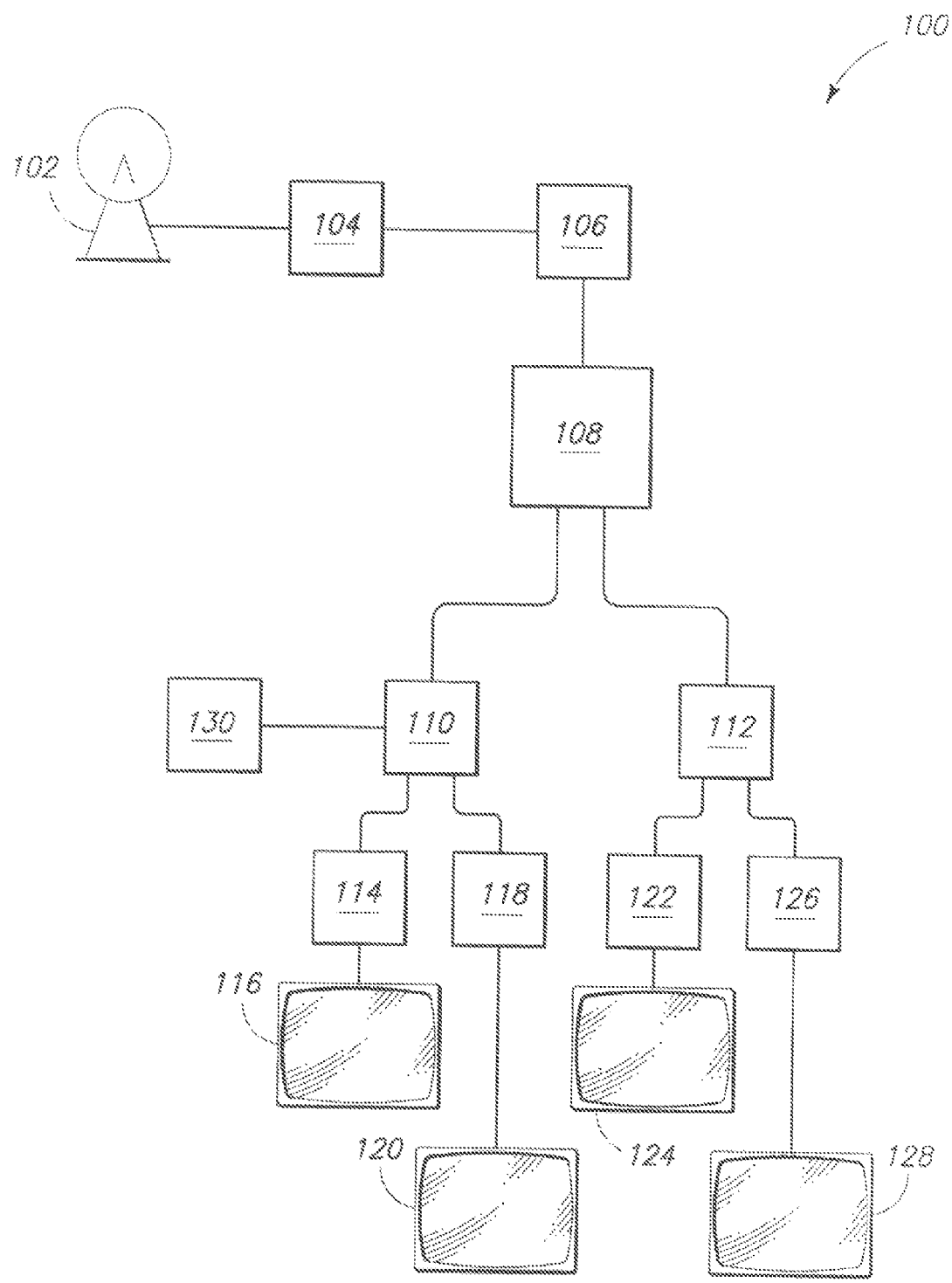
FIG. 1 is a block diagram of a network.

FIG. 1 illustrates a multicast video distribution network 100. Network 100 includes a satellite receiver 102; a packetization device 104; a multicast server 106; three packet switches 108, 110, and 112; four multicast clients 114, 118, 122, 126; four video monitors 116, 120, 124, and 128; and a device 130.

Satellite receiver 102 may receive a wireless signal including video information for one or more television channels from a satellite and convert the wireless signal into a video signal. Satellite receiver 102 may provide the video signal to packetization device 104. Packetization device 104 may convert the video signal into a plurality of packet services. Each packet service may include a plurality of packets (e.g., IP and/or Ethernet packets) containing coded video information representing a television channel. Packetization device 104 may forward the packet services to multicast server 106.

Multicast server 106 may forward the packet services to multicast clients as multicast packet services made up of multicast packets. In one configuration, multicast server 106 may be a multicast router. Packet switches 108, 110, and 112 may forward the multicast packets of the multicast packet services to multicast clients 114, 118, 122, and 126.

Multicast clients 114, 118, 122, and 126 may receive multicast packets from packet switches 110 and 112. In the depicted configuration, multicast clients 114, 118, 122, and 126 may be set-top boxes that receive multicast packets of a multicast packet service containing coded video information and convert the coded video information into video signals that may be displayed respectively by monitors 116, 120, 124, and 128.

Forwarding a packet service as a multicast packet service may improve network efficiency. For example, packet switche 108 may receive a multicast packet service from multicast server 106. Upon receiving a single original multicast packet of the multicast packet service, packet switch 108 may recognize a multicast destination addresses contained by the single original packet and in response may duplicate the packet and forward one duplicate of the packet to packet switch 112 and another duplicate of the packet to packet switch 110.

Similarly, packet switch 110 may duplicate the packet and forward one duplicate of the packet to multicast client 114 and another duplicate of the packet to multicast client 118. Packet switch 112 may similarly duplicate the packet and forward one duplicate of the packet to multicast client 122 and another duplicate of the packet to multicast client 126. Consequently, each of multicast clients 114, 118, 122, and 126 may receive a duplicate of the single original multicast packet as a result of multicast server 106 sending the single original multicast packet to packet switch 108.

In some configurations, packet switch 108, packet switch 110, and/or packet switch 112 may selectively duplicate multicast packets of a multicast packet service so that multicast clients who have requested the multicast packet service receive the multicast packets of the multicast packet service but multicast clients who have not requested the multicast packet service do not receive the multicast packets of the multicast packet service.

Device 130 may be a device configured to transmit packets including packets having multicast addresses. Device 130 may, in one configuration, disrupt the multicast packet service by maliciously or otherwise transmitting multicast packets to packet switch 110 that interfere with the multicast packet service by competing for bandwidth with the multicast packets of the multicast packet service or by overwhelming an ability of one or more of the multicast clients to properly receive and process the multicast packet service.

A multicast packet service may include multicast packets having a same multicast destination address. In some configurations, the multicast destination address may be a layer-three multicast destination address such as an Internet Protocol multicast destination address. In other cases, the multicast destination address may be a layer-two multicast destination address such as an Ethernet multicast destination address. The multicast packets of the multicast packet service may, in one configuration, relay encoded video information associated with a television channel. The multicast packet service may include multicast packets transmitted by multicast server 106 over time. For example, the multicast packet service may include multicast packets, each of which contain a portion of the video of a television channel, that are separated in time by a particular interval.

FIG. 2 is a chart 200 illustrating messaging between multicast server 106 and multicast client 114. The messaging between multicast server 106 and set top box 114 may be relayed by a network 202. In one configuration, network 202 may include packet switches 108 and 110 illustrated in FIG. 1. At 204, multicast client 114 may send a packet to multicast server 106 containing a request to receive a particular multicast packet service. The particular multicast packet service may be a video service as was described above. In one configuration, the request may be an IGMP membership report and may be referred to as a request to join. Network 202 may forward the request from multicast client 114 to multicast server 106.

In response to receiving the request to receive the particular multicast packet service, multicast server 106 may determine that it is not currently forwarding multicast packets of the particular multicast packet service to network 202 and consequently multicast server 106 may begin forwarding the particular multicast packet service to network 202.

In one configuration, multicast server 106 may be forwarding multicast packets of the particular multicast packet service to network 202 prior to receiving the request from multicast client 114. For example, multicast server 106 may be forwarding multicast packets of the particular multicast packet service to network 202 and network 202 may be forwarding the particular multicast packet service to a different multicast client such as multicast client 122 (illustrated in FIG. 1).

In this configuration, packet switch 108 may receive the particular multicast packet service from multicast server 106 and may forward the particular multicast packet service to packet switch 112 because packet switch 108 may know that multicast client 122 had previously requested the particular multicast packet service from multicast server 106. However, packet switch 108 might not forward the particular multicast packet service to packet switch 110 because packet switch 108 might know that neither multicast client 114 nor multicast client 118 had requested the particular multicast packet service from multicast server 108.

Accordingly, in this configuration, when multicast client 114 sends the request for the particular multicast packet service to multicast server 108, packet switch 108 may intercept the request and based on the request may begin forwarding the particular multicast packet service to packet switch 110, which in turn may forward the particular multicast packet service to multicast client 114. Packet switch 108 may forward the request on to multicast server 106 or may discard the request.

Consequently, at 206, multicast client 114 may receive the multicast video packets of the particular multicast packet service. At 208, multicast client 114 may send a packet to multicast server 106 notifying multicast server 106 that multicast client 114 no longer desires to receive the particular multicast packet service. In one configuration, the notification may be an Internet Group Management Protocol (IGMP) leave message conforming to an IGMP protocol defined by the Internet Engineering Task Force. In response to receiving the notification, multicast server 106 may determine that no other multicast clients associated with network 202 have requested the particular multicast packet service and consequently multicast server 106 may cease forwarding the particular multicast packet service to network 202.

In one configuration, packet switch 108 may intercept the notification send by multicast client 114. Packet switch 108 may determine whether other multicast clients are receiving the particular multicast packet service. For example, packet switch 108 may determine that packet switch 108 is forwarding the multicast packet service to multicast client 126. In this example, in response to intercepting the notification, packet switch 108 may continue to forward the particular multicast packet service to packet switch 112 so that multicast client 126 may continue to receive the particular multicast packet service, but may cease forwarding the particular multicast packet service to packet switch 110.

In contrast, if packet switch 108 determines that no multicast clients other than multicast client 114 are currently receiving the particular multicast packet service, packet switch 108 may forward the notification to multicast server 106 so that multicast server 106 may cease forwarding the particular multicast packet service to packet switch 108.

At 210, multicast server 106 may send a query message to multicast client 114. The query message may have the same multicast destination address as the particular multicast packet service. The query message may request that multicast clients currently receiving the multicast packet service reply to the query if they desire to continue receiving the multicast packet service. In one configuration, the query message may be an IGMP query message and the reply to the IGMP query message may be an IGMP membership report.

According to one aspect of the invention, a packet switch operating method includes determining an identifier of an authorized multicast packet service. A first device connected to the packet switch provides the multicast packet service. The method also includes receiving a multicast packet including the identifier from a different second device connected to the packet switch, determining the multicast packet is unauthorized, and preventing the packet switch from forwarding the unauthorized multicast packet to a third device connected to the packet switch.

Determining the identifier may include extracting the identifier from a packet received from either the second device or the third device. The packet may include a request for the authorized multicast packet service. Alternatively, determining the identifier may include extracting the identifier from a packet belonging to the multicast packet service, obtaining the identifier from a configuration of the packet switch, or obtaining the identifier from a user of the packet switch.

The identifier may include a particular multicast destination address. Alternatively, the identifier may include a particular layer-two or layer-three source address. The particular multicast destination address may be an Internet Protocol (IP) multicast destination address. Alternatively, the particular multicast destination address may be an Ethernet multicast destination address.

The received multicast packet may be determined as unauthorized because it does not comprise either a request to receive the multicast packet service or a notification that the multicast packet service is no longer desired. Furthermore, the received multicast packet may be determined as unauthorized because it includes an Internet Group Management Protocol (IGMP) membership query. Preventing the packet switch from forwarding the unauthorized multicast packet may include discarding the unauthorized packet.

The authorized multicast packet service may include authorized multicast packets and the method may also include forwarding the authorized multicast packets received from the first device to the second device and the third device. The authorized multicast packet service may include a plurality of multicast packets comprising video information.

The method may also include receiving an authorized multicast packet including the identifier from the second device and forwarding the authorized multicast packet to the first device. The authorized multicast packet may include either an IGMP membership report or an IGMP leave message.

According to another aspect of the invention, a packet switch operating method includes determining an IP multicast destination address of an authorized multicast packet service. The multicast packet service is provided from a first device connected to the packet switch and includes a plurality of multicast packets comprising video information. The method also includes duplicating the multicast packet service provided by the first device, forwarding one duplicate of the multicast packet service to a different second device connected to the packet switch, and forwarding another duplicate of the multicast packet service to a different third device connected to the packet switch.

The method also includes receiving a multicast packet comprising the IP multicast destination address from the second device, determining the multicast packet is unauthorized based on the fact that the multicast packet comprises the IP multicast destination address, and preventing the packet switch from forwarding the unauthorized multicast packet to the third device.

According to another aspect of the invention, a packet switch operating method includes receiving a first packet including a first multicast destination address from a first device connected to a first port of the packet switch and forwarding the first packet to a second device connected to a second port of the packet switch. The first device having previously requested to receive packets including the second multicast destination address. The method also includes receiving a second packet including a second multicast destination address from the second device and preventing the packet switch from forwarding the second packet to the first device. The packets may be Ethernet packets and the first multicast address may match the second multicast address.

The method may also include one or more actions prior to preventing the packet switch from forwarding the second packet to the first device selected from among determining that a source address of the first packet does not match a source address of the second packet, determining that the second packet does not include either a request to join a multicast group associated with the second multicast destination address or a request to leave the multicast group, determining that the second multicast destination address matches the first multicast destination address, and determining that the second multicast destination address is a member of a set of prohibited multicast destination addresses.

According to another aspect of the invention, a packet switch includes a first port, a second port, a third port, and forwarding circuitry connected to the first port, the second port, and the third port. The forwarding circuitry is configured to forward first packets including a particular multicast destination address received from the first port to the second and third ports, and to prevent second packets including the particular multicast destination address received from the second port from being forwarded to the third port.

The second packets might not include either a request to join a multicast group associated with the particular multicast destination address or a request to leave the multicast group. The forwarding circuitry may be configured to prevent the second packets from being forwarded to the first port.

The first packets may include video information and the first and second packets may include a first tag. The forwarding circuitry may be further configured to receive third packets including a different second tag and the particular multicast destination address from the first port, to prevent the third packets from being forwarded to the second and third ports, and to forward fourth packets having the second tag and the particular multicast destination address to the first port.

The tags may include at least one identifier selected from among a Virtual Local Area Network (VLAN) identifier, a Multiprotocol Label Switching (MPLS) label, a provider bridging (PB) identifier, a provider backbone bridging (PBB) identifier, a provider backbone transport (PBT) identifier, a provider backbone bridging—traffic engineering (PBB-TE) label, and a Virtual Private LAN Service (VPLS) identifier.

FIG. 3 is a block diagram of a network 300. Network 300 includes packet switches 108, 110, and 112 and multicast server 106 and shows further details of packet switch 108 of FIG. 1. As depicted in FIG. 3, packet switch 108 includes three ports 302, 304, and 306. Port 302 is connected to multicast server 106, port 304 is connected to packet switch 110, and port 306 is connected to packet switch 112. Packet switch 108 also includes forwarding circuitry 308, which is connected to ports 302, 304, and 306.

Forwarding circuitry 308 may forward packets between ports 302, 304, and 306. For example, forwarding circuitry 308 may forward a packet received from port 302 to port 304 and/or port 306. Forwarding circuitry 308 may forward the packet based at least on a destination address of the packet.

Forwarding circuitry 308 may comprise circuitry configured to implement desired programming provided by appropriate media in at least one embodiment. For example, forwarding circuitry 308 may be implemented as one or more of a processor and/or other structure configured to execute executable instructions including, for example, software and/or firmware instructions, and/or hardware circuitry. Exemplary embodiments include hardware logic, programmable gate arrays, field programmable gate arrays, application specific integrated circuits, network processing units, state machines, and/or other structures alone or in combination with a processor. These examples are for illustration; other configurations are possible.

At 310, forwarding circuitry 308 may receive a packet containing a request to receive a particular multicast packet service referred to herein as multicast packet service "A" from packet switch 110 via port 304. The request may be an IGMP join message. Packet switch 110 may have previously received the packet from multicast client 114 (shown in FIG. 1). In response to receiving the packet, forwarding circuitry 308 may forward the packet to multicast server 106.

After receiving the packet, multicast server 106 may, at 312, begin forwarding multicast packets of multicast packet service "A" to packet switch 108 via port 302. Forwarding circuitry 308 may forward multicast packet service "A" to packet switch 110 via port 304 and packet switch 110 may forward the multicast packet service to multicast client 114.

Forwarding circuitry 308 may determine an identifier for multicast packet service "A." For example, forwarding circuitry 308 may extract an identifier of multicast packet service "A" from the request packet. In one configuration, the identifier may be a multicast destination address (e.g., an IP multicast address or an Ethernet multicast address) associated with multicast packet service "A." Forwarding circuitry 308 may associate the identifier with port 304 since the request for multicast packet service "A" came from port 304.

FIG. 3A depicts a chart 350 containing identifiers, listed in column 354, associated with ports of packet switch 108, listed in column 352. Row 356 of chart 350, by way of example, indicates that forwarding circuitry 308 has associated port 304 with identifier 224.0.252.6 which may be an IP multicast address used by multicast packet service "A."

Forwarding circuitry 308 may also associate port 302 with the identifier since port 302 is the source of multicast packet service "A." In one configuration, forwarding circuitry 308 may determine that port 302 is the source of multicast packet service "A" by observing that multicast packets having the identifier are received on port 302 in response to the request.

In another configuration, forwarding circuitry 308 may determine that port 302 is the source of multicast packet service "A" by observing that query messages for multicast packet service "A" are received on port 302. In yet another configuration, a user or management system may configure packet switch 108 with a configuration specifying that port 302 is the source port for the identifier and forwarding circuitry 308 may determine that port 302 is the source of multicast packet service "A" by examining the configuration.

At 318, forwarding circuitry 308 may receive a packet containing a request from packet switch 112 to receive a particular multicast packet service referred to herein as multicast packet service "B" via port 306. Packet switch 110 may have previously received the packet from multicast client 122

(shown in FIG. 1). In response to receiving the packet, forwarding circuitry 308 may forward the packet to multicast server 106.

In response to receiving the packet, multicast server 106 may, at 316, begin forwarding multicast packets of multicast packet service "B" to packet switch 108 via port 302. Forwarding circuitry 308 may forward multicast packet service "B" to packet switch 112 via port 306 and packet switch 112 may forward multicast packet service "B" to multicast client 122.

Using the techniques described above, forwarding circuitry 308 may determine an identifier for multicast packet service "B." Row 358 of chart 350, by way of example, indicates that forwarding circuitry 308 has associated port 306 with identifier 224.0.252.7 which may be an IP multicast address used by multicast packet service "B."

Forwarding circuitry 308 may be configured to discard query messages having an identifier associated with a multicast packet service that are received from a port that is not the source port of a multicast packet service. Such query messages may be characterized as unauthorized. At 314, forwarding circuitry 308 may receive a query message having multicast address 224.0.252.6 from packet switch 110. Packet switch 110 may have received the query message from device 130 (shown in FIG. 1). Forwarding circuitry 308 may examine the query message and determine that the multicast destination address of the query message matches the identifier (address 224.0.252.6) of multicast packet service "A." Furthermore, forwarding circuitry 308 may determine that port 302, not port 304, is the source port for multicast packet service "A." Consequently, forwarding circuitry 308 may discard the query message.

Preventing the query message from being forwarded may prevent device 130 from learning (via responses to the query) which multicast clients are receiving the multicast packet service associated with the identifier and may thereby prevent device 130 from disturbing multicast packet service "A." Forwarding circuitry 308 may similarly discard other unauthorized multicast control protocol messages having an identifier associated with a multicast packet service that are received from a port that is not the source port of the multicast packet service.

In addition to discarding an unauthorized multicast packet, packet switch 108 may provide notification that the unauthorized multicast packet was discarded. For example, packet switch 108 may record the notification in a log, notify a management system (e.g., by sending a Simple Network Management Protocol (SNMP) trap or providing an SNMP object identification through which the notification may be made available), or modify a configuration or statistic of packet switch 108.

In contrast, had a query message having the identifier associated with multicast packet service "A" (address 224.0.252.6) been received on port 302, forwarding circuitry 308 may have forwarded the query message to port 304 and/or port 306 since port 302 is the source port for multicast packet service "A." Such a message may be characterized as an authorized message.

Forwarding circuitry 308 may discard other unauthorized multicast packets received on port 304. In one configuration, forwarding circuitry 308 may, at 326, receive a packet having a multicast destination address. Based on the packet's multicast destination address and the fact that port 304 is not a source port for multicast packet service "A," forwarding circuitry 308 may discard the packet. For example, forwarding circuitry 308 may discard the packet because it has a multicast address.

In another configuration, forwarding circuitry 308 may discard the packet because it has a multicast address that is a member of a set of multicast addresses. In another configuration, forwarding circuitry 308 may discard the packet because it has a multicast address that matches the identifier of multicast packet service "A."

In yet another configuration, forwarding circuitry 308 may discard the packet because it has a multicast address that matches the identifier of multicast packet service "A" and because a source address of the packet does not match a source address of the multicast packet service.

At 324, forwarding circuitry 308 may receive a packet containing a request to receive multicast packet service "A." Such a packet may be characterized as authorized. The packet may have a multicast destination address matching the identifier of multicast packet service "A." Forwarding circuitry 308 may forward the packet to multicast server 106 even though the packet has the identifier because forwarding circuitry 308 may be configured to forward requests to join multicast packet service "A."

Forwarding multicast packets containing a request to join multicast packet service "A" may allow multiple multicast clients to receive multicast packet service "A." For example, prior to forwarding the packet to packet switch 108, packet switch 110 may have received the packet from multicast client 118. Since multicast client 118 may legitimately request multicast packet service "A," forwarding circuitry 308 may forward the request.

Similarly, forwarding circuitry 308 may forward notices that a multicast packet service is no longer desired (e.g., leave messages). Such requests may be characterized as authorized. For example, at 322 forwarding circuitry 308 may receive a multicast packet containing a request to discontinue receiving multicast packet service "B." Rather than discarding the multicast packet because it has a multicast destination address matching the identifier for multicast packet service "B," forwarding circuitry 308 may forward the packet to multicast server 106.

Although the above discussion has used a multicast packet service providing video content as an example, the multicast packet service is not limited to providing video content. In fact, the operation of forwarding circuitry 308 may be independent of the content of the multicast packet service.

FIG. 4 is a block diagram of a network 400. Network 400 includes satellite receiver 102, packetization device 104, multicast server 106, and packet switches 108, 110, and 112 described above. In addition, network 400 includes an additional satellite receiver 424, an additional packetization device 422, an additional multicast server 420, and an additional packet switch 402. Packet switches 108 and 402 are connected via a connection 408.

Satellite receiver 424 may receive a wireless signal including video information in a manner similar to satellite receiver 102. However, in one configuration satellite receiver 424 may receive different video information (e.g., different television channels) than satellite receiver 102. Packetization device 422 may convert the video signal provided by satellite receiver 424 into a packet service in a manner similar to that described above in relation to packetization device 104.

Multicast server 420 may forward the packet service provided by packetization device 420 to multicast clients 114, 118, 122, and/or 126 (illustrated in FIG. 1) as multicast packet services made up of multicast packets in a manner similar to that described above in relation to multicast server 106.

Packets switch 402 includes two ports 418 and 404. In addition, packet switch 402 may include forwarding circuitry (not illustrated) similar to forwarding circuitry 308 described above. Connection 408 may be a direct physical connection between packet switch 108 and packet switch 402 such as a cable. Alternatively, connection 408 may be a logical connection (e.g., a VLAN or a packet tunnel) connecting packet switch 108 and packet switch 402 together via one or more additional packet switches (not illustrated).

Packet switch 108 may provide a multicast packet service to packet switch 402. This multicast packet service is referred to herein as multicast packet service "C." Forwarding circuitry 308 may receive multicast packet service "C" from multicast server 106 and may forward multicast packet service "C" to packet switch 402 via port 406. Forwarding circuitry 308 or packet switch 108 may mark the multicast packets of multicast packet service "C" with a tag 410 prior to forwarding the multicast packets to packet switch 402. For example, the multicast packets of multicast packet service "C" may be marked with a one or more tags selected from among a VLAN identifier, an MPLS label, a PB identifier, a PBB identifier, a PBT identifier, a PBB-TE label, and a VPLS identifier.

Tag 410 may serve as a way to distinguish packets associated with multicast packet service "C" from other packets relayed by connection 408. Furthermore, tag 410 may be used to restrict the ports of packet switch 108 and/or 402 to which multicast packet service "C" may be forwarded.

Similarly, packet switch 402 may provide a multicast packet service to packet switch 108. This multicast packet service is referred to herein as multicast packet service "D." Packet switch 402 may receive multicast packet service "D" from multicast server 420 and may forward multicast packet service "D" to packet switch 108 via port 404. Packet switch 402 may mark the multicast packets of multicast packet service "D" with a tag 412 prior to forwarding the multicast packets to packet switch 108. Tag 412 may be different from tag 410.

Like tag 410, tag 412 may serve as a way to distinguish packets associated with multicast packet service "D" from other packets relayed by connection 408. Furthermore, tag 412 may be used to restrict the ports of packet switch 108 and/or 402 to which multicast packet service "D" may be forwarded. Forwarding circuitry 308 may associate tag 410 with multicast packet service "C" and may associate tag 412 with multicast packet service "D."

Using the techniques described above in relation to FIGS. 3 and 3A, forwarding circuitry 308 may determine an identifier (e.g., multicast destination address) associated with multicast packet service "C" and may determine that port 302 is the source port of multicast packet service "C." Similarly, forwarding circuitry 308 may determine an identifier associated with multicast packet service "D" and may determine that port 406 is the source port of multicast packet service "D." The identifier associated with multicast packet service "C" and the identifier associated with multicast packet service "D" may be the same identifier. For example, multicast packet service "C" and multicast packet service "D" may both use the same multicast destination address.

Upon receiving a packet from port 406 having the identifier associated with multicast packet service "C" and being marked with tag 410, forwarding circuitry 308 may discard the packet since the packet has the identifier of multicast packet service "C" but was not received from the source port associated with multicast packet service "C." Of course, if the packet includes a request to receive multicast packet service "C" or a notice that multicast packet service "C" is no longer desired, forwarding circuitry 308 may forward the packet instead of dropping the packet.

However, upon receiving a packet from port 406 having the identifier associated with multicast packet service "D" and being marked with tag 412, forwarding circuitry 308 may forward the packet even though it has the same identifier as multicast packet service "C" since the packet is marked with tag 412, not with tag 410. In this manner, forwarding circuitry 308 may distinguish between multicast packets marked with tag 410 and multicast packets marked with tag 412.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
   the packet switch receiving a first packet comprising a first multicast destination address from a first device connected to a first port of the packet switch and forwarding the first packet to a second device connected to a second port of the packet switch;
   after the receiving of the first packet, the packet switch receiving a second packet comprising a query message with a second multicast destination address from the second device, the first device having previously requested to receive packets comprising the second multicast destination address;
   the packet switch analyzing a source of the second packet, comparing the source of the second packet to a source of an associated multicast service, and determining if the query message is authorized based thereon; and
   the packet switch discarding the second packet if the query message is unauthorized based upon receiving the second packet on the second port with the second multicast destination address if the query message originates from a source that is not the source of the associated multicast service.

2. The method of claim 1 wherein the packets are Ethernet packets, the first multicast address matches the second multicast address, and the multicast addresses are IP multicast destination addresses.

3. The method of claim 1 further comprising, prior to the discarding, the packet switch determining that a source address of the first packet does not match a source address of the second packet.

4. The method of claim 1, wherein a packet switch is configured to implement the method.

5. The method of claim 1 further comprising:
prior to the receiving of the first packet, the packet switch receiving a third packet comprising the first multicast destination address from the second device via the second port, the third packet comprising a request to receive a multicast packet service from the first device; and
prior to the receiving of the first packet and as a result of the receiving of the third packet, the packet switch forwarding the third packet to the first device via the first port.

6. The method of claim 1 wherein the second packet includes a request that a multicast client receiving the second packet indicate to the second device that the multicast client desires to receive a multicast packet service associated with the second multicast destination address.

7. The method of claim 1 further comprising recording the discarding of the second packet in a log of the packet switch.

8. The method of claim 1 further comprising:
the packet switch receiving a third packet comprising the first multicast destination address from the second device via the second port; and
the packet switch forwarding the third packet to the first device via the first port.

9. The method of claim 8 further comprising, prior to the discarding, the packet switch determining that the third packet includes a request to leave a multicast group associated with the first multicast destination address.

10. The method of claim 9 further comprising, prior to the discarding, the packet switch determining that the second multicast destination address matches the first multicast destination address.

11. The method of claim 9 further comprising, prior to the discarding, the packet switch determining that the second multicast destination address is a member of a set of prohibited multicast destination addresses.

12. A packet switch comprising:
a first port;
a second port;
a third port; and
forwarding circuitry connected to the first port, the second port, and the third port and configured to forward first packets comprising a particular multicast destination address received from the first port to the second and third ports, to analyze a source of the second packets, to compare the source of the second packets to a source of an associated multicast service, to determine if the second packets comprise an unauthorized query message, and to prevent second packets comprising the unauthorized query message with the particular multicast destination address received from the second port from being forwarded to the third port, and to forward third packets comprising the particular multicast destination address received from the second port to the first port, wherein the second packets are discarded based upon being received from the second port with the particular multicast destination address if the query message originates from a source that is not the source of the associated multicast service.

13. The packet switch of claim 12 wherein the first and second packets comprise a first tag and the third packets comprise a different second tag but not the first tag and the forwarding circuitry is further configured to forward the third packets to the third port.

14. The packet switch of claim 13 wherein the tags comprise at least one tag selected from among a Virtual Local Area Network (VLAN) identifier, a Multiprotocol Label Switching (MPLS) label, a provider bridging (PB) identifier, a provider backbone bridging (PBB) identifier, a provider backbone transport (PBT) identifier, a provider backbone bridging—traffic engineering (PBB-TE) label, and a Virtual Private LAN Service (VPLS) identifier.

15. The packet switch of claim 12 wherein the forwarding circuitry is configured to prevent the second packets from being forwarded to the first port.

16. The packet switch of claim 12 wherein the second packets do not include either a request to join a multicast group associated with the particular multicast destination address or a request to leave the multicast group.

17. The packet switch of claim 12 wherein the first packets comprise video information.

18. A multicast packet distribution method, comprising:
receiving a request to receive a multicast packet service;
forwarding the request to a multicast server;
receiving the multicast packet service from the multicast server and forwarding the multicast packet service based on the request;
determining and storing an identifier of the multicast packet service with a plurality of identifiers;
analyzing a source of query messages;
comparing the source of the query messages to a source of an associated multicast service to determine if the query messages are unauthorized based thereon; and
discarding the unauthorized query messages based upon determining the query messages originate from a source that is not the source of the associated multicast service using the plurality of identifiers, wherein the plurality of identifiers comprise any of multicast destination address, layer-two source address, layer-three source address, and received port of the query messages or multicast packets.

19. The multicast packet distribution method of claim 18, further comprising:
managing the plurality of identifiers based upon a plurality of requests.

20. The multicast packet distribution method of claim 18, further comprising:
discarding multicast control protocol messages based upon the plurality of identifiers.

* * * * *